Dec. 24, 1963     J. M. CHRISTENSEN     3,115,417

DAYLIGHT FLUORESCENT TAPE STRUCTURE

Filed June 2, 1960

INVENTOR.
Joseph M. Christensen
BY
Ooms, McDougall, Williams & Hersh
Attorneys

3,115,417
DAYLIGHT FLUORESCENT TAPE STRUCTURE
Joseph M. Christensen, 219 E. Lake Shore Drive, Chicago, Ill.
Filed June 2, 1960, Ser. No. 33,477
4 Claims. (Cl. 117—33.5)

This invention relates to a daylight fluorescent structure and more particularly to a daylight fluorescent structure in the form of a pressure-sensitive adhesive tape separable into individual segments capable of use as daylight fluorescent stickers.

It is an object of this invention to produce a pressure-sensitive adhesive tape which is separable into individual segments or stickers and wherein each segment embodies a daylight fluorescent image in condition for release of the daylight fluorescigenous energy and wherein each segment is effective in position of use to protect the daylight fluorescent material from deterioration by elements normally existing in the atmosphere and it is a related object to produce such separable elements for use as an attractive display which reflects visible light in amounts greater than the amount of visible light striking the element and which retains its brightness and glow over extended periods of time even when exposed to direct sunlight.

These and other objects and advantages of this invention will hereinafter appear and, for purposes of illustration, but not of limitation, an embodiment of the invention is shown in the accompanying drawing in which—

Figure 1:
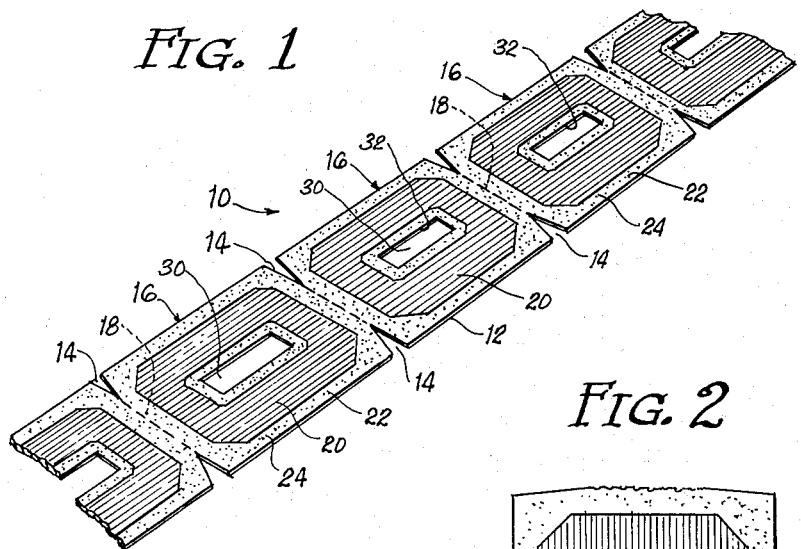
FIG. 1 is a schematic perspective view of a tape embodying the features of this invention.
Figure 2:
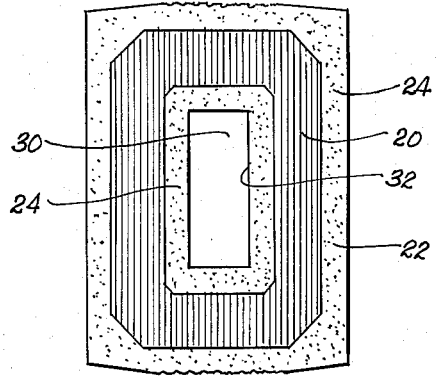
FIG. 2 is an elevational view of a segment of the tape shown in FIG. 1.

Referring first to the drawing, the numeral 10 illustrates an endless tape having as its base sheet a strip 12 of clear and transparent plastic which is substantially impervious to air and moisture or other elements existing in the atmosphere but which permits visible light rays of 4000 angstrom units up to 7000 angstrom units easily and substantially completely to pass therethrough and which also permits a substantial proportion of shorter rays within the range of 2500 to 4000 angstrom units to pass therethrough.

For this purpose, use can be made of thin pliable strips of from 2–50 mills thickness formed of polystyrene, polymethylmethacrylate, cellulose acetate, nitrocellulose, regenerated cellulose, polyvinylidene chloride, vinyl acetate-vinyl chloride copolymer, polyvinyl chloride, polyesters (Mylar polyethylene terephthalate) and the like. The strip 10 is subdivided throughout its length by indentations 14 into separable segments 16 having the form of letter outlines, designs or shapes, or in which such letter outlines, designs or shapes are imprinted by the daylight fluorescent material. For this purpose, each segment 16 is identified by an indentation 14 extending inwardly from the opposite edges for a distance short of the center so that a trailing edge 18 remains by which one segment is attached to the other in the endless tape. The trailing edge remaining between the indentations is either scored, or punched, to provide closely spaced openings therethrough or otherwise weakened to enable the segments to be easily torn or severed for easy and quick separation from the tape.

Located inwardly from the free edges of each of the segments and provided on one side of the base sheet 12 is a coating 20 of a daylight fluorescent material in condition for release of fluorescigenous energy for conversion of invisible rays of wave lengths of light (2500–4000 angstrom units) to visible light of longer wave lengths of 4000 to 7000 angstrom units whereby the amount of light reflected from the daylight fluorescent coating contains not only that of the visible light range striking the coating but also some of the invisible light which has been converted to visible light by the daylight fluorescent material such that the amount of visible light reflected is more than the amount of visible light striking the article. Such daylight fluorescent coating applied to the one side of the base film may be arranged in any letter outline, image or other configuration for imparting a message or the like.

Daylight fluorescent materials capable of use in formulation of the coating are selected of organic dyes such as diamino-stilbene-di-sulfuric acid, berberin sulfate, tetraethyl-diamino-o-carboxyphenyl, xanthenyl chloride, tetramethyl - di - amino - diphenyl - ketonamine hydrochloride, auranin, tetraethyl-diamino-xanthenyl chloride (pyronin B), sodium-tetraethyl-diamino-sulfophenyl-xanthenyl sulfonate (xylene red B), diethyl-n-amino-phenolphthalein hydrochloride (rhodamine B), diethyl-diamino-o-carboxyphenyl, xanthenyl-chloride-ethyl ester (rhodamine 6 G), and fluorescein.

In order for the daylight fluorescent dyestuff to be able to release its fluorescigenous energy, it is essential for the dyestuff to be made available in the coating in a dissolved state in a suitable carrier or pigment. When the daylight fluorescent dyestuff is incorporated as a component directly into the carrier for application as an ink or paint onto the transparent base film, such carrier may be formulated of solutions or dispersions of suitable clear film forming materials in which the daylight fluorescent dyestuff is soluble, such as polymeric resinous film forming resinous materials represented by polymethylmethacrylate or other polyalkyl acrylates, urea formaldehyde resin, melamine formaldehyde resins or alkyd resins, or of a urea formaldehyde, melamine formaldehyde, or benzoguanamine formaldehyde resin modified para-toluene sulfonamide, as defined in the copending application of Voedisch et al., Ser. No. 741,224, filed June 11, 1958, now abandoned. For such purpose, it will be sufficient if the daylight fluorescent dyestuff is present in the coating composition in an amount ranging from 0.1 to 1.5 percent by weight. In the event that the daylight fluorescent dyestuff does not in itself embody sufficient color for coloring the coating, the coating composition may be formulated with additional dyestuffs of the desired color present in amounts corresponding to from 0.1 to 5 percent by weight of the coating composition.

Instead, the daylight fluorescent dyestuff may be dissolved in a suitable resinous material which is advanced to a hardened stage and ground to form a pigment which can be embodied in a suitable clear varnish or carrier for use as the coating composition. In the formulation of such pigment in which the daylight fluorescent dyestuff is present in a dissolved state for release of its fluorescigenous energy, use can be made of a thermosetting resinous material such as urea formaldehyde, phenol formaldehyde, or an alkyd resin in accordance with the teachings of the Switzer Patent No. 2,498,592. Instead, the daylight fluorescent dyestuff can be formulated into a thermoplastic resinous material such as urea formaldehyde or melamine formaldehyde modified para-toluene sulfonamide resin which is advanced to a hardened stage for pigment formation as described in the Kazenas Patent No. 2,809,954. Such pigment can be formulated into a suitable clear varnish or carrier in an amount corresponding to 1 to 10 percent by weight of the composition, with or without the addition of other coloring pigments or dyestuffs in the amounts previously described for color contrast in the coating.

The following is an example of a coating composition which may be used in the practice of this invention:

Example 1

73.38 percent by weight toluene sulfonamide formaldehyde resin (Santolite MHP—Monsanto Chemical Company)
14.00 percent by weight benzoguanamine
6.00 percent by weight paraformaldehyde
4.00 percent by weight water
0.66 percent by weight Rhodamine BX
0.62 percent by weight Rhodamine 7G
1.34 percent by weight Brilliant Yellow 6G base The following are examples of the preparation of a suitable pigment embodying a daylight fluorescent material in a dissolved state:

Example 2

59.18 percent by weight toluene sulfonamide formaldehyde resin (Santolite MPH)
28.00 percent by weight benzoguanamine
10.00 percent by weight paraformaldhyde (91% purity)
0.72 percent by weight Rhodamine BX
0.66 percent by weight Rhodamine 7G
1.44 percent by weight Brilliant Yellow 6G base

Example 3

48.50 percent by weight of a mixture of o- and p-toluene sulfonamide (Santicizer 9)
25.00 percent by weight benzoguanamine
18.00 percent by weight paraformaldehyde (91% purity)
6.00 percent by weight water
0.63 percent by weight Rhodamine BX
0.59 percent by weight Rhodamine 7G
1.28 percent by weight Brilliant Yellow 6G base The following are examples of coating formulations with the pigments of Examples 2 and 3:

Example 4

55.0 percent by weight polyacrylic resin solution (Acryloid F-10)
40.0 percent by weight pigment from Examples 2 and 3
0.8 percent by weight dried expanded silica gel (Santocel 54)
4.2 percent by weight mineral spirits

Example 5

40.7 percent by weight toluene sulfonamide-formaldehyde resin (Santolite MHP)
30.5 percent by weight benzoguanamine
26.4 percent by weight formalin (37% formaldehyde)
2.4 percent by weight Brilliant Yellow 6G base Deterioration of the daylight fluorescent dyestuff has been found to be materially accelerated by the elements existing in the normal atmosphere when the daylight fluorescent coating is exposed to direct sunlight. Thus, the daylight fluorescent dyestuff would quickly lose its ability to release its fluorescigenous energy for conversion of invisible rays to visible light rays unless the coating embodying the fluorescent dyestuff is protected from the atmosphere in position of use.

For this purpose, I have devised a new and novel combination wherein the daylight fluorescent coating is applied to one side of the transparent base film spaced inwardly from the free edges of the sheet and more particularly spaced inwardly from the free edges of the individual segments when severed from the endless tape. The portions 22 adjacent the free edges of the backing film and free of the daylight fluorescent coating are provided with a coating 24 of a conventional pressure-sensitive adhesive applied to the same side of the clear backing film as the daylight fluorescent coating.

Figure 3:
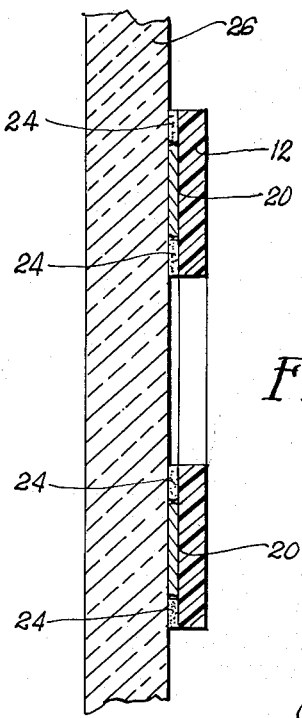
FIG. 3 is a sectional elevational view of the tape applied onto a supporting surface in use.

By this construction, each segment can be separated, when desired, from the tape and applied with the coated side onto a supporting surface. The pressure-sensitive adhesive layers 24 function in the dual purpose of adhesively bonding the segment onto the supporting surface while at the same time completely sealing off the daylight fluorescent coating from elements normally existing in the atmosphere. When, for example, the segment is adhesively bonded onto the inner surface of a glass window 26 (see FIG. 3), the daylight fluorescent material 20 will be clearly visible through the clear glass plate 26 while being protected from the atmosphere by the glass plate 26 on the one side and the transparent film 12 on the other side and with the pressure-sensitive adhesive coating 24 about its edges. When, on the other hand, the segment is bonded onto the outer surface of a glass plate or other support, the daylight fluorescent dyestuff will show through the film backing 12 and it will be protected from the atmosphere by the support on the one side, the film on the other side and the pressure-sensitive adhesive about the edges.

When the segment forms a part of the continuous tape, it will be apparent that the pressure-sensitive adhesive will coat the lateral edges of the strip and that it will also coat the leading and trailing edges lengthwise of the segment to span the cutoff between the segments, as illustrated in FIG. 1. When, as illustrated in the drawing, the segment corresponds to a loop letter, such as the letter "O," having a cutout 30 in the center, the daylight fluorescent coating will be applied to the backing sheet spaced inwardly from the outer edges of the segment and spaced outwardly from the inner edge of the loop with pressure-sensitive adhesive coating the free edges including the edges 32 about the loop thereby to confine the daylight fluorescent coating 20 therebetween.

The following are representative of formulations which may be used as the pressure-sensitive adhesive. It will be understood that adhesives which are non-tacky when dry but which become adhesive when wet may also be used, such as an adhesive formulated of casein, zein, glue, synthetic resinous binding cements, latex, and the like.

Example 6

| | Parts |
|---|---|
| Latex rubber | 3.5 |
| Zinc oxide | 3.6 |
| Crepe rubber | 1.5 |
| Rosin | 4.0 |
| Ester gum | 1.0 |
| Hexane solvent | 30.0 |

Example 7

| | Parts |
|---|---|
| Crepe rubber | 4.0 |
| Zinc oxide | 1.5 |
| Ester gum | 3.0 |
| Rosin | 2.0 |
| Mineral oil | 1.0 |
| Heptane solvent | 25.0 |

It will be apparent from the foregoing that I have provided an endless tape having a pressure-senstitive adhesive coating along predetermined areas on one side with a daylight fluorescent coating on the same side separate and apart from the pressure-sensitive adhesive and bounded by the pressure-sensitive adhesive so that the daylight fluorescent material will be confined within a sealed space when the segments of the tape are severed from the tape and bonded onto a supporting surface. It will be apparent also that the daylight fluorescent material thus applied in sealing relationship on a supporting surface may be adapted to be visible through the supporting film or through the supporting surface upon which it is attached, if such supporting surface is transparent. The daylight fluorescent material in the coating will be effective to convert invisible rays of light into visible rays of light whereby the design formed by the coating containing the daylight fluorescent material will glow in daylight and will thus provide a very attractive and outstanding letter of configuration, message, design, or the like.

It will be further understood that the separable segments of the tape may be in particular configurations or that reliance may be had upon the daylight fluorescent coating to provide the desired words, letters, images or message on the transparent film backing.

It will be understood that instead of providing indentations in the tape for separation of the individual segments, other means for separation of the tape into its segments may be provided but with the understanding that the pressure-sensitive adhesive will line the free edges of the film backing so as to be disposed between the free edges and the daylight fluorescent material for sealing the latter from the atmosphere when applied onto a supporting surface.

It will be understood further that other changes may be made in the details of construction and operation without departing from the spirit of the invention, especially as defined in the following claims.

I claim:

1. A continuous tape subdivided lengthwise into separable segments joined one to the other across their corresponding trailing and leading edges, each segment being formed of a film base, a color coating containing a daylight fluorescent material in a fluorescent state comprising a fluorescent dyestuff in a dissolved state applied directly to one side of the film base free of pressure-sensitive adhesive material and spaced from the free edges thereof, and a pressure-sensitive adhesive coating on the one side of the film base and on the uncoated portions of the film base between the daylight fluorescent color coating and the free edges of the film base.

2. A tape as claimed in claim 1 in which the film base comprises a transparent plastic film forming material.

3. A tape as claimed in claim 1 in which the segments into which the tape is divisible is defined by score lines extending crosswise of the tape for tearing.

4. A tape as claimed in claim 1 in which the daylight fluorescent coating is in the form of letter outlines.

References Cited in the file of this patent

UNITED STATES PATENTS

| | | |
|---|---|---|
| 257,017 | Keller | Apr. 25, 1882 |
| 2,333,641 | Corwin | Nov. 9, 1943 |
| 2,341,583 | Tuve | Feb. 15, 1944 |
| 2,475,529 | Switzer et al. | July 5, 1949 |
| 2,953,865 | Heuser | Sept. 27, 1960 |